United States Patent [19]
Bielfeldt et al.

[11] 3,847,525
[45] Nov. 12, 1974

[54] APPARATUS FOR THE INJECTION MOLDING OF SYNTHETIC-RESIN ARTICLES

[75] Inventors: Friedrich Bernd Bielfeldt, Aidenried; Richard Flohrs Richardsen, Seefeld, Oberalting, both of Germany

[73] Assignee: Krauss-Maffei Aktiengesellschaft, Munchen, Germany

[22] Filed: June 21, 1971

[21] Appl. No.: 154,792

[30] Foreign Application Priority Data
June 26, 1970 Germany............................. 2031657

[52] U.S. Cl.............. 425/245 R, 425/247, 425/244, 425/DIG. 229
[51] Int. Cl............................................... B29f 1/05
[58] Field of Search ........... 425/145, 147, 159, 166, 425/244, 245, 247, 250, 248, 242, 245 R, 425/249, DIG. 229

[56] References Cited
UNITED STATES PATENTS

| | | | |
|---|---|---|---|
| 2,505,540 | 4/1950 | Goldhard............................ | 425/145 |
| 2,939,176 | 6/1960 | Adelman........................ | 425/145 X |
| 3,024,498 | 3/1962 | Bronnenkant et al. | 425/DIG. 229 X |
| 3,512,216 | 5/1970 | Voelker......................... | 425/247 X |
| 3,516,123 | 6/1970 | Lang et al....................... | 425/244 X |
| 3,611,505 | 10/1971 | Weber et al. ...................... | 425/244 |
| 3,709,644 | 1/1973 | Farrell ............................... | 425/160 |
| 3,709,644 | 1/1973 | Farrell ............................... | 425/244 |

FOREIGN PATENTS OR APPLICATIONS
656,120  9/1963  Italy

*Primary Examiner*—J. Spencer Overholser
*Assistant Examiner*—David S. Safran
*Attorney, Agent, or Firm*—Karl F. Ross; Herbert Dubno

[57] ABSTRACT

An injection system for use with injection-molding machines wherein a storage chamber or accumulator is filled with the thermoplastic synthetic resin during the charging of the mold and, during shrinkage of the mass within the mold cavity, the contents of this reservoir are forced into the mold cavity to compensate for such contraction. Subsequent injection-molding operations are carried out as soon as the previous injection-molding operation is terminated and the shrinkage or contraction of the mass within the previously-charged mold cavity begins.

2 Claims, 4 Drawing Figures

PATENTED NOV 12 1974　　　　3,847,525

Friedrich B. Bielfeldt
Richard F. Richardsen
INVENTORS.

BY

Karl G. Ross
Attorney

Friedrich B. Bielfeldt
Richard F. Richardsen
INVENTORS.

BY
Karl F. Ross
Attorney

APPARATUS FOR THE INJECTION MOLDING OF SYNTHETIC-RESIN ARTICLES

CROSS REFERENCE TO RELATED APPLICATION

This application is related to the commonly assigned copending application Ser. No. 136,707 filed Apr. 23, 1971 by Friedrich Bernd BIELFELDT, one of the present joint inventors, and entitled "METHOD OF INJECTION MOLDING".

FIELD OF THE INVENTION

Our present invention relates to an apparatus for injection-molding a thermoplastic synthetic resin and adapted to form a part of an injection-molding machine. More particularly, the invention relates to such apparatus as are intended to accelerate the production of injection-molded articles.

BACKGROUND OF THE INVENTION

An injection-molding process and apparatus generally makes use of a separable mold assembly provided with one or more mold cavities or set of mold cavities, mechanism for opening and closing the mold assembly for ejection of finished articles or the molding of additional articles, an injector cylinder or assembly in which a liquified or flowable thermoplastic mass is forced by a plunger or otherwise into the mold cavity, and timer or programming means for sequencing the various operations such as opending and closing of the mold assembly, advance or retraction of the plunger.

In principle, the thermoplastic synthetic resin in a flowable state is forced into the mold cavity defined between two or more mold parts held under pressure in a closed condition. Systems of this type are known wherein a number of mold cavities or sets of mold cavities are provided in a single assembly and the latter is closed by a single mold-closure device common to all of the cavities or set of cavities.

In the latter arrangements, a valve, distributor or slide mechanism may be provided with a manifold for initially introducing the flowable synthetic resin into one mold cavity or set of mold cavities, then into another, etc. The advantages of such techniques reside in the fact that a number of mold cavities can be charged during a single mold-opening/mold-closing cycle, while each molded cavity or set of mold cavities may be dimensioned to receive the full injection capacity of the apparatus during the interval in which the cavities are charged. Thus, if the overall mold assembly has a mold-cavity volume in excess of the "single-shot" capacity of the injection device, the mold cavities are subdivided into sets having an overall capacity equal to or less than that of the single-shot capacity and, during a single mold-closing cycle, a number of shots are made, depending upon the number of such sets. The production of large numbers of articles in an efficient manner is a key advantage.

It has been observed, in the injection molding of thermoplastic synthetic resins, that the mold-closing pressure and the pressure necessary to retain the mold in a closed condition during injection (the latter being termed the closed-mold holding pressure or force) increases during injection to a peak value and thereafter decreases. Of course, the increase of this force or pressure is directly related to the fact that the injection of the synthetic resin material into the mold cavities is effected under a pressure which tends to urge the mold members apart.

The decrease in the force or pressure, following the aforementioned peak, appears to be a result of a volume contraction of the injected synthetic resin which relieves the pressure within the mold. It is manifest that, where all of the mold cavities are filled simultaneously with the full injection pressure, the mold and mold-closure system must be dimensioned to resist greater forces than those which apply to mold assemblies in which only part of the mold is filled or in which only one mold or section of mold cavities is filld.

To minimize the maximum pressure to which the mold closure system is subjected, it has been proposed to completely terminate the first injection step (molding in the first cavity or set of mold cavities) before injection is commenced in the second mold cavity or mold cavities. In other words a complete injection cycle of injection, termination of injection, cooling and contraction is required before the next injection step is commenced.

This procedure, while retaining for the single mold-closing cycle the advantages of a reduced number of mold openings and closures, also possesses the disadvantage that the sequence of injection-molding steps occupies considerable time.

In the aforementioned application, this disadvantage is avoided by overlapping each subsequent injection cycle with the previous one by commencing the second injection step simultaneously with the end of the injection action of the first and while contraction of the injection-molded material in the first cavity or set of cavities is under way.

OBJECTS OF THE INVENTION

It is the general object of the present invention to provide an injection-molding machine and an injection-molding apparatus in which the above-mentioned disadvantages are obviated and the principles of the prior application mentioned earlier are extended.

It is another object of our invention to provide an apparatus for nullifying the effects of contraction of a synthetic resin mass injection molding in a mold cavity.

Another object of the invention is to provide an injection-molding system in which the molding rate is increased without necessarily increasing the dimensions of the apparatus to withstand an elevated closed-mold holding force. It is also an object of the invention to provide an improved injection-molding system which obviates the aforementioned disadvantages and provides improved utilization of an injection-molding machine, as well as more efficient production of injection-molded articles.

Yet another object of the invention is an injection-molding machine for increasing the productivity.

Still further, it is an object of the invention to provide an improved injection-molding machine which eliminates some of the aforementioned disadvantages.

SUMMARY OF THE INVENTION

As described above and in the above-mentioned copending application, it is a principle of the system of the latter to make use of the fact that the synthetic-resin material in the previously charged mold contracts with volume reduction and thereby reduces the mold-holding pressure or force as this force is increased by the injection of the synthetic-resin material into a subsequent mold. While the amount of contraction which does occur, may not be significant in small-article production, the injection molding of large articles requires some attention to the volume contraction of the mass.

According to the present invention, an accumulator or storage reservoir for synthetic resin communicates with the mold cavity and is provided with means for displacing synthetic resin into the mold cavity during the volume contraction of the synthetic-resin mass there, thereby compensating for contraction of the mass. The pressure used to displace the additional synthetic resin is preferably dimensioned to compensate only for the resistance to flow of the synthetic-resin material, and dimensioned so as not to materially increase the pressure tending to separate the mold members or to increase the closed-mold holding pressure. Each of the mold cavities or set of mold cavities charged during a single injection period may be provided with a respective accumulator or storage chamber and plunger or piston.

According to the present invention, therefore, the method may involve the steps of:

a. closing the mold assembly containing a plurality of mold cavities or sets of mold cavities connected by respective distribution branches to a common injection apparatus;

b. injecting the synthetic-resin material into the first cavity or set of mold cavities, thereby building up a mold-separating pressure until the peak pressure is attained, while simultaneously permitting the somewhat elastic mold-closing means to build up a countervailing mold-holding force;

c. storing an additional quantity of synthetic resin in an antechamber, reservoir or accumulator communicating with the first mold or mold cavity;

d. disconnecting the first mold cavity or set of mold cavities from the main injector when the aforementioned peak pressure is achieved and permitting the mass within the first mold cavity or set of mold cavities to cool and contract while simultaneously commencing the feed of the thermoplastic to the second mold cavity or set of mold cavities;

e. during the contraction of the mass within the first mold cavity or set of mold cavities and independently of the main injection, forcing the stored thermoplastic into the first mold cavity or set of mold cavities to compensate for the contraction; and d. repeating the sequence until all mold cavities or sets of mold cavities are charged with the synthetic resin, whereupon the mold assembly is opened and the articles ejected.

For each mold cavity or set of mold cavities, therefore, we provide an accumulator with a plunger operable independently of the main injection system and effective when the main injection step is terminated to force the additional synthetic resin into the mold cavity or set of mold cavities with an afterpressure. The afterpressure level and the duration of its application may be independent of the duration of the injection operation and the injection pressure. It is important to the present invention that the accumulator be charged with the synthetic resin during the same period in which injection is carried out in the associated mold cavity or set of mold cavities. In this case, any delays between the filling of the individual mold cavities can be avoided.

In structural terms, the device of the present invention may have various configurations. For example, each form (mold cavity or set of mold cavities) may be provided with a respective auxiliary plunger and storage compartment or accumulator communicating with the mold cavity or set of mold cavities. The accumulator may be provided in the distributing branch of the injector manifold and preferably is in the path of the main injection stream and so arranged and constructed that the thermoplastic material during main injection and after injection is distributed uniformly. The pressure and displacement of the additional quantity of synthetic resin material is applied uniformly also over the entire body of solidifying thermoplastic within the mold cavity.

According to another feature of the invention, the system also includes a valve for blocking the main-injection stream prior to displacement of the thermoplastic from the accumulator into the mold or mold cavity. The piston or plunger which serves as the valve member may be additionally displaceable to constitute the afterpressure ram or may simply define a duct through which the stored synthetic resin may be displaced by some other ram. In the latter case, the stroke of the plunger or valve member is independent of the stroke of the resin-displacing ram.

According to the invention, the injection of synthetic-resin material into a following mold cavity, i.e., the commencement of the charging thereof with the flowable synthetic resin under pressure, is initiated prior to the total drop in mold-spreading pressure occasioned by the previous charge. In other words, the beginning of the injection step of a subsequent mold or group of molds coincides with the pressure drop resulting from contracting of the mass in the previously charged cavity or group of cavities. The charging of one cavity or set of cavities thus overlaps the pressure-fall portion of the previous charge. The charging of each subsequent cavity or set of cavities thus coincides at least in part with the period of solidification of the synthetic resin mass of a previous charge, thereby increasing the output of the injection-molding machine. It will be apparent that by overlapping each injection step with the previous and subsequent steps, the number of injection steps, per working cycle can be increased.

It has been found to be desirable to provide the mold-closing arrangement with an elasticically deformable beam or the like which, once the mold is closed at the desired mold-closing pressure, will be able to take up the additional force (in resilient yielding) developed during the injection phase. When the maximum deflection is reached, charging of one cavity can be terminated and the other commenced so that the pressure-fall period of the first charge coincides with the pressure-rise period of the second.

DESCRIPTION OF THE DRAWING

The above and other objects, features and advantages of the present invention will become more readily apparent from the following description, reference being made to the accompanying drawing in which.

SPECIFIC DESCRIPTION

Figure 4:
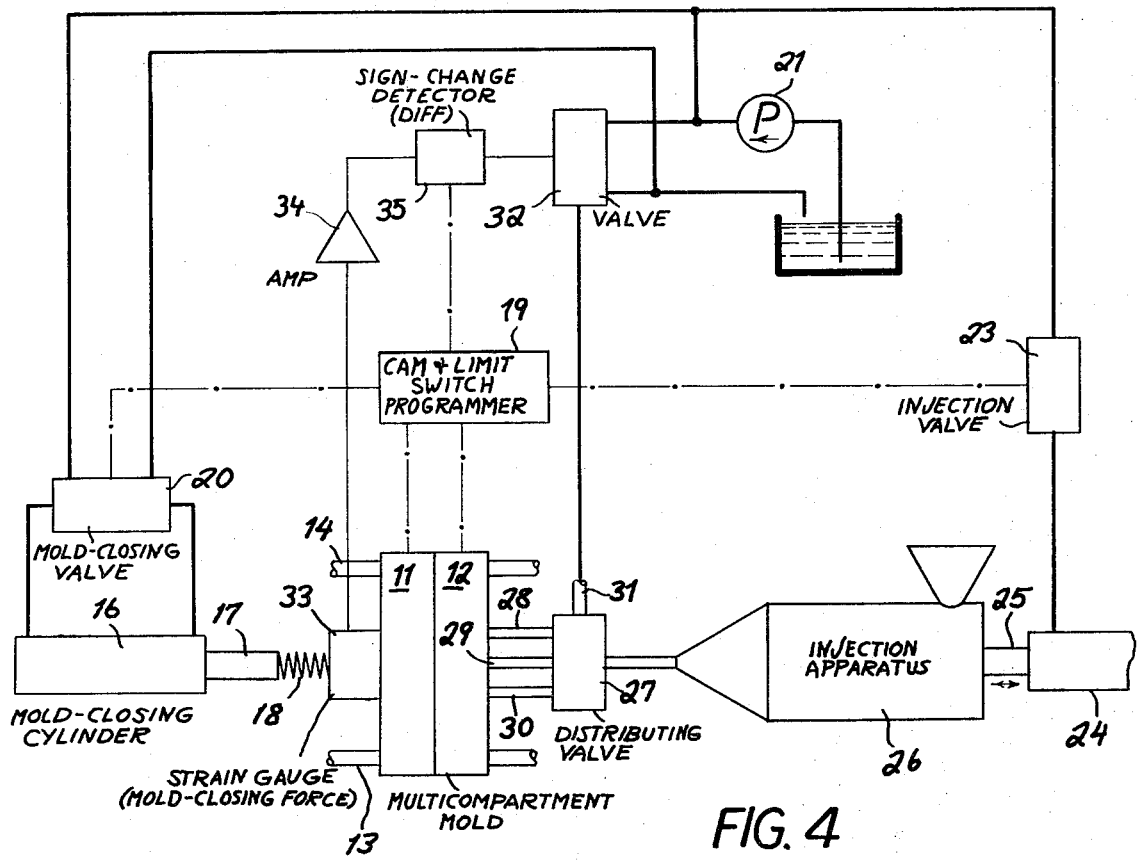
FIG. 4 is a diagram illustrative of certain principles of the present invention.

In FIG. 4, there is diagrammatically illustrated an injection-molding system for practicing the present invention. The system comprises a mold 10, here shown to consist of a pair of mold halves 11 and 12, which are guided upon the usual rails 13 and 14. Generally, both mold members can be movable. But for the purposes of the present invention, only mold member 11 has been shown to be provided with a mold-closing apparatus generally represented at 15. This apparatus may comprise a cylinder 16 with a piston 17 coupled with the movable mold member 11. The inherent elasticity of the mold-closing system is represented by spring 18. The mold-closing cycle is determined by a cam or limit switch programmer 19 of conventional construction which operates a valve 20 for supplying hydraulic fluid to the cylinder 16 from a pump 21. The programmer 19 also controls a valve 23 which supplies fluid to the cylinder 24 of the injector ram 25. The ram chamber, which may be heated by an appropriate muffle, is represented at 26.

From the injection apparatus 24-26, the flowable synthetic resin is passed by a distributing valve 27 to the individual mold cavities or sets of mold cavities via lines 8, 29 and 30, all of which are shown diagrammatically. The injector arrangement may be of the type described in U.S. Pat. No. 3,024,498.

The valve 27 is provided with a fluid-responsive controller 31, the operation of which is controlled by a valve 32. A strain detector (strain gauge 33) in the mold-closing structure, responds to the pressure built up within the mold and is connected via an amplifier 34 to a signal-change detector 35, e.g., a differentiator, responding to the passage of the force or pressure characteristic through the peak valve. The output at 35 triggers the valve 32 to operate the distributing valve 27 and commence the feed of thermoplastic material to the next set of mold cavities. In essence, therefore, the overall mold cycle will consist of the following steps:

a. mold closure and closed-mold holding;
b. connection of distributor 27 to the first set of mold cavities;
c. operation of injection apparatus 24-26 to feed synthetic resin to first set of mold cavities. (The pressure within the mold and, therefore, the mold-closure or holding force rises to the peak);
d. injection-molding apparatus 24-26 is cut off and/or valve 27 is blocked and the synthetic resin supply bypassed (optional) when the first mold cavity is fully charged (this corresponds to the peak);
e. upon the sign change in the pressure characteristic corresponding to the beginning of the pressure drop, valve 27 is triggered to permit flow to the next valve cavity or set of cavities. This sequence (c) and (d) is repeated until all of the cavities are charged;
f. mold opening and article ejection.

Figure 3:
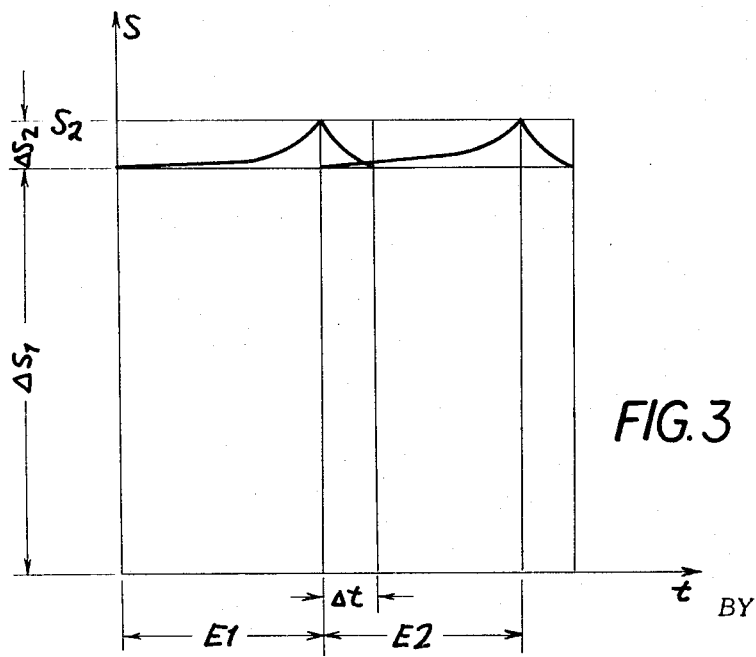
FIG. 3 is a graph of the elastic yielding of the mold-closing apparatus plotted along the ordinate against time plotted along the absicissa according to the present invention.

In FIG. 3, there is shown a characteristic curve of a portion of the operation of a single working cycle with two successive injection steps as described. In the graph, the elastic yielding S of the mold-closing arrangement is plotted against the time $t$. The characteristic begins with a yielding force $\Delta S_1$ which corresponds to the closing force and increases during the injection period E1 or E2 to the level $\Delta S_2$ in which the yielding force has the maximum value of $S_2$. The reaction to this yielding stress upon the beam of the closing arrangement increases the closed-mold holding force of the closure arrangement above the set mold closure force to a maximum value. With the cooling of the synthetic resin in the mold cavity, coinciding with a volume shrinkage thereof, the beam resiliently responds to decrease the closed-mold holding force from this maximum value to the originally set value whereby the curve falls to the level $\Delta S_1$. In FIG. 3, the two injection steps are shown to overlap in the sense that the injection process for the first set of mold is terminated when the maximum beam deflection $S_2$ is reached, this simultaneously serving as the initiation point for the injection of the second group. The pressure increase of the latter group overlaps in time the pressure fall of the previous group and a saving of $\Delta t$ per injection operation is obtained.

Figure 2:
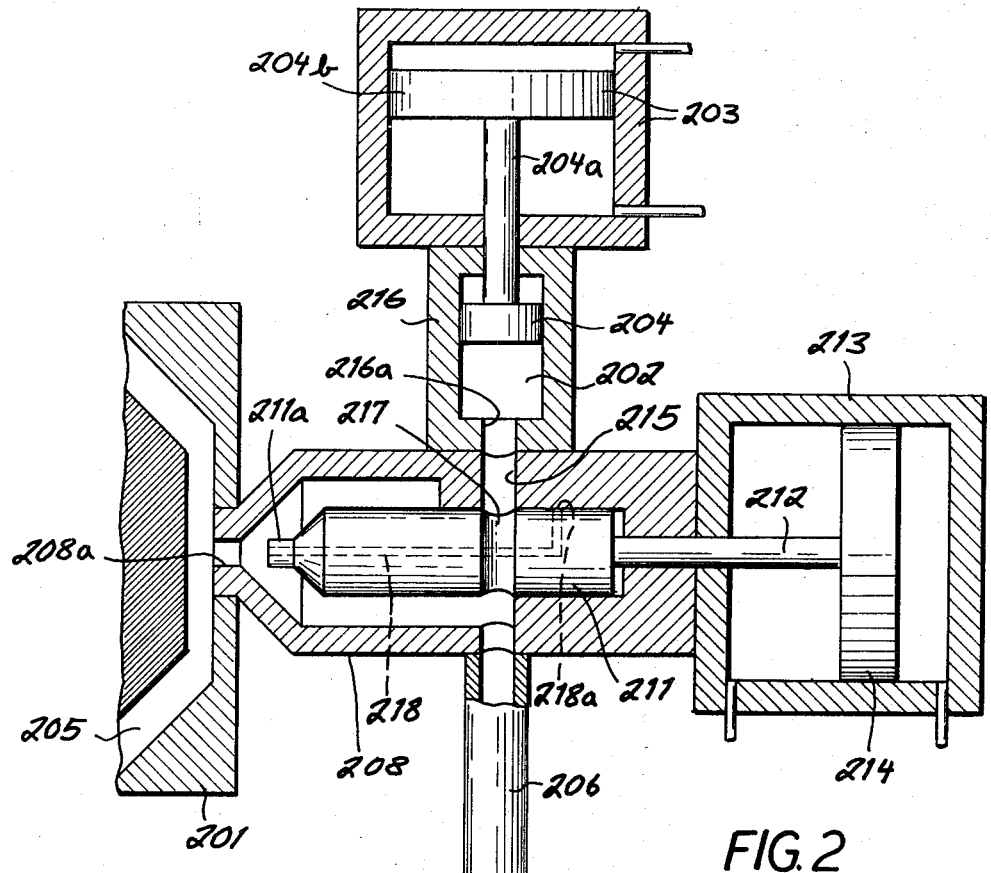
FIG. 2 is an axial cross-sectional view in which a separate ram is provided for the additional quantity of the thermoplastic material.
Figure 1:
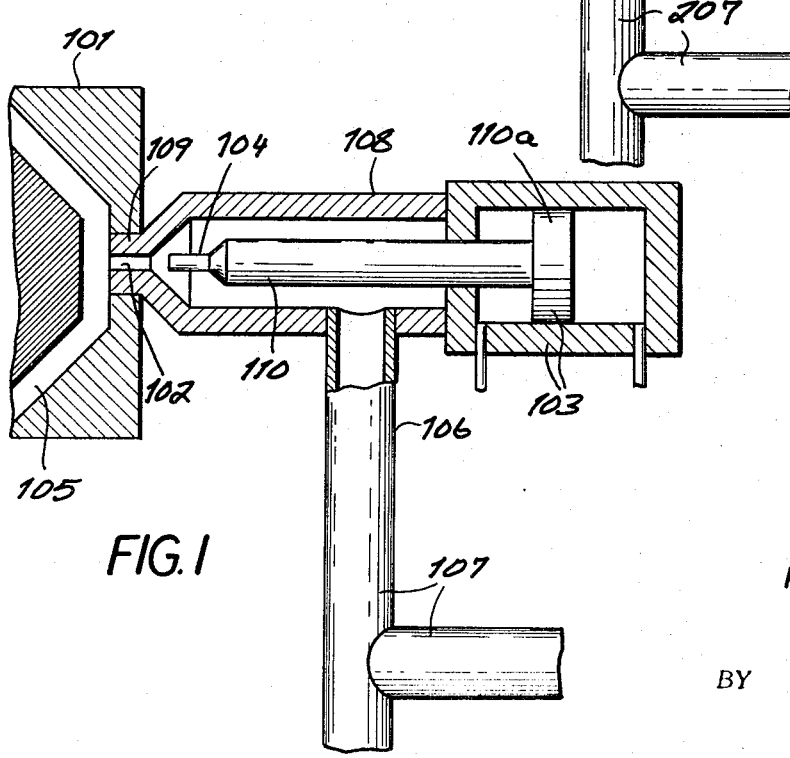
FIG. 1 is a longitudinal cross section of a system according to the present invention which opens directly into the mold cavity.

In FIGS. 1 and 2 of the drawing, we show an embodiment of the invention in which the thermoplastic synthetic resin is supplied to the mold cavity 101 or 201 by a manifold 107, 207 in which the branch 106, 206 for the illustrated mold 101, 201 alone has been illustrated. In each of the embodiments, a cylindrical accumulator or storage reservoir 102, 202 is provided. In each case, a hydraulically operated piston-and-cylinder arrangement 103, 203 is provided to displace a ram 104, 204 designed to force synthetic resin of the accumulator into the mold cavity 105, 205 to follow the contraction of the mass.

During the filling of the mold cavity 105, 205 in the main injection stage $E_1$ or $E_2$ as previously described, the accumulator 102, 202 is filled via the manifold 107, 207 and the respective branch 106, 206. After termination of the injection step at the respective pressure peak, the ram arrangement 104 or a plunger 211 blocks further flow of the synthetic-resin material to the mold cavity 105, 205 from the manifold branch 106 or 206, while the injector assembly begins the charging of a second mold cavity. The contraction of the material in the first mold cavity is followed by displacement of the accumulator contents as will be described hereinafter. Both the afterpressure of this further quantity of thermoplastic and the duration over which it is fed to the mold cavity can be independent of the charging times for the mold cavities during the injection phase, although this time T should be equal to or less than $E_1 + \Delta t$, $E_2 + \Delta t$, etc.

In the system of FIG. 1, the branch 106 feeds into a tube 108 forming a cylinder in which the ram 104 is axially displaceable as a stub on the end of a piston rod 110, the piston 110a of which forms part of the piston-and-cylinder arrangement 103. A cylindrical boss 109 at the end of the cylinder 108 is received in the mold 101 so that the accumulator chamber 102 opens directly into the mold cavity 105. When the ram 104 is advanced into the accumulator compartment 102, further supply of thermoplastic from branch 106 is terminated. Continued displacement of the rod 110 by the afterpressure developed in the cylinder assembly 103 supplies the additional quantity of thermoplastic necessary to compensate for contraction of the mass within cavity 105.

In the arrangement of FIG. 2, the branch 206 also opens into a cylindrical housing 208, the left-hand end of which is received within the mold 201. Here, however, the valve structure is formed by the cylindrical body 211 which has a block formation 211a adapted to fit into a passage 208a of the cylinder 208 and prevent further supply of thermoplastic from branch 206. In addition, the valve member 211 is formed with a passage 218 which opens at plug 211a into the cavity 205. Passage 218 has an end portion 218a which registers with the storage chamber 202 in the closed position of the valve. Chamber 202 is, in turn, formed by a cylinder 216 which has a passage 216a communicating with a radial bore 215 formed in the cylinder 208 and with a circumferential groove 217 formed in the valve body 218 when the latter is in its unblocking position.

The valve body 211 is, in turn, operable independently or the ram 204 which is, in this embodiment, constituted as a piston connected by a rod 204a with the piston 204b of the cylinder arrangement 203. The valve member 211 is connected by a rod 212 with the piston 214 of a hydraulically actuated cylinder 218. When the peak pressure is attained in cavity 205, corresponding to the end of the main injection period $E_1$, the cylinder 213 is energized to close the valve 211 past which the chamber 202 has previously been charged with excess thermoplastic. The ram 204 may then be operated to drive the excessive synthetic resin into the mold cavity 205 to follow the contraction thereof. The closed-mold holding pressure during this period need not be increased materially since the afterpressure may simply be sufficient to overcome the resistance to flow of the additional quantity of material. However, this afterpressure may be increased above that required to compensate for the flow resistance by an amount equal to the difference between the pressure $S_2$ and the instantaneous pressure contributions of the main injection steps at $E_1$, $E_2$ etc.

The device according to this invention is usable with resins of the polyolefin family, e.g., polyethylene, polypropylene, polybutylene, and mixtures thereof, synthetic resins of the polystyrene family such as acrylonitrile-butadiene-styrene, and also polyvinylchloride and copolymers thereof, such as polyvinylchloride vinylacetate.

The press temperature and pressure depends on the resin used and the size of the charge. Pressures can vary between about 800 atmospheres to about 1,600 atmospheres while the temperature can be about 200°C, although variations from these figures are entirely possible.

We claim:
1. An apparatus for the injection molding of articles from a thermoplastic, comprising:
   a. a mold assembly having at least one mold cavity;
   b. mold-closure means connected with said mold assembly for opening and closing said mold assembly and for maintaining same closed with a mold-closing force;
   c. injector means for charging said mold cavity with the thermoplastic;
   d. means forming an accumulator communicating with said mold cavity;
   e. a ram displaceable to feed an accumulated portion of thermoplastic into said mold cavity following contraction of the thermoplastic mass therein after injection of the latter, said mold assembly being formed with a plurality of such mold cavities and said injector means being so constructed and arranged to charge said mold cavities with said thermoplastic in succession, each of said mold cavities being provided with a respective one of such accumulators in communication therewith, and with a respective ram displaceable to feed the respective accumulation of thermoplastic from the respective accumulator into the respective mold;
   f. flow-blocking means between said injector means and each of said mold cavities for terminating the flow of thermoplastic to the respective mold cavity and enabling the injector means to charge another mold cavity prior to operation of the ram of the former mold cavity, said flow-blocking means including a valve member provided with a recess affording communication between said injector means and said accumulator, each ram being operable independently of the respective valve member, said recess being a circumferential groove formed on said valve member, said valve member being further provided with a passage interconnecting said accumulator and the respective mold cavities in a closed position of said valve member.

2. An injection-molding apparatus comprising, in combination:
   A ram-type injection-molding machine having an outlet through which a charge of synthetic resin is displaceable at an injection pressure in a short of the injection-molding machine;
   a manifold connected directly to said outlet for receiving said charge and distributing the same to a plurality of manifold branches;
   a mold assembly having respective mold cavities connected to each of said branches; and
   a respective valve assembly between each of said branches and the respective mold cavity, each of said valve assemblies comprising:
   means forming a valve chamber connected to the respective branch and formed with a passage leading to the respective mold cavity,
   a valve body displaceable toward and away from said passage in said chamber and received therein with all-around clearance, said valve body being formed with a projection of smaller cross-section than the remainder of said body and receivable within the passage upon displacement of said valve member from an unblocking to a blocking position whereby said chamber and the respective branch are disconnected from the respecitve mold cavity, and
   fluid-operated means for displacing synthetic resin in said chamber against the pressure in said mold into the respective mold cavity just prior to the disposition of said valve member in its blocking position to postinject at least a portion of the synthetic resin in said chamber into the respective mold cavity, each of said valve assemblies further comprising a storage compartment communicating with the respective chamber and receiving synthetic resin of said charge while the respective valve member is in an unblocking position, said fluid-operated means including a ram displaceable in said compartment independently of said valve member.

* * * * *